United States Patent [19]

Thompson

[11] 4,429,582
[45] Feb. 7, 1984

[54] VORTEX SHEDDING FLOWMETER CIRCUIT WITH ANALOG AND PULSE OUTPUT SIGNAL

[75] Inventor: William L. Thompson, Chardon, Ohio

[73] Assignee: The Babcock & Wilcox Company, New Orleans, La.

[21] Appl. No.: 329,531

[22] Filed: Dec. 10, 1981

[51] Int. Cl.³ .............................................. G01F 1/32
[52] U.S. Cl. ................................................ 73/861.22
[58] Field of Search ....................... 73/861.22, 861.24; 307/362, 519, 522; 328/5, 140

[56] References Cited

U.S. PATENT DOCUMENTS 3,491,305  1/1970  Stone .................................. 328/140
3,984,773  10/1976  Oda ..................................... 324/78 J
4,084,155  4/1978  Herzl et al. ....................... 73/861.22

Primary Examiner—Charles E. Frankfort
Assistant Examiner—David R. Schuster
Attorney, Agent, or Firm—Vytas R. Matas; Robert J. Edwards

[57] ABSTRACT

A circuit for a vortex shedding flowmeter is disclosed which generates an analog signal proportional to the vortex shedding frequency and a pulse signal which equals or is proportional to the vortex shedding frequency signal. A scaling or range selection counter can be provided between the pulse signal and an output stage for changing the effective range of measurement by dividing the shedding frequency by a selected and known number.

4 Claims, 5 Drawing Figures

VORTEX SHEDDING FLOWMETER CIRCUIT WITH ANALOG AND PULSE OUTPUT SIGNAL

FIELD AND BACKGROUND OF THE INVENTION

The present invention relates in general to vortex shedding flowmeter circuits and in particular to a new and useful circuit for processing the signal from a vortex shedding flowmeter which generates an analog and a pulse signal both of which are proportional to the output of the vortex shedding flowmeter sensor. This provides compatible outputs for connection to a digital control system without interface.

Vortex shedding flowmeters are known. In such flowmeters an obstruction or bluff is positioned in a fluid flow. Vortices are generated at alternate sides of the obstruction with a frequency which is proportional to the volumetric flow rate. The passage of the vortices thus is counted to provide a signal which indicates the flow rate.

Such a system is disclosed for example in U.S. Pat. No. 4,094,194 to Herzl.

It is also known to use a two wire transmission line for supplying power and receiving the signal from the vortex shedding flowmeter. Such a transmission line and arrangement is shown for example in U.S. Pat. Nos. 4,123,940 to Herzl et al and 4,134,297 to Herzl.

In prior art circuitry for processing the signal from a vortex shedding flowmeter, it has been necessary to provide an interface between the sensing equipment and digital control systems for processing the signal.

SUMMARY OF THE INVENTION

The present invention is drawn to an improved arrangement for processing a vortex shedding flowmeter signal which produces output signals which are directly compatible with digital control systems.

Accordingly an object of the invention is to provide a vortex shedding flowmeter circuit which generates both an analog and a pulse signal, both of which are proportional to the vortex shedding flowmeter sensor signal.

Another object of the invention is to provide such circuitry wherein the preamplified vortex shedding frequency signal is supplied to a one shot for producing pulses which pulses are processed through a low pass filter to produce an analog signal which is proportional to the vortex shedding frequency.

A further object of the invention is to tap the pulse signal directly from the one shot to produce a pulse frequency signal with frequency which is proportional to the vortex shedding frequency.

A further object of the invention is to provide both the analog and pulse signals with a typical 4–20 mA output which is compatible with known two wire transmission systems for vortex shedding flowmeters.

A still further object of the invention is to provide a range selection circuit for receiving the pulse signal to scale or change the range of measurement of the vortex shedding flowmeter.

Another object of the invention is to provide a circuit arrangement for a vortex shedding flowmeter which is simple in design and economical to manufacture.

The various features of novelty which characterize the invention are pointed out with particularity in the claims annexed to and forming a part of this disclosure. For a better understanding of the invention, its operating advantages and specific objects attained by its uses, reference is made to the accompanying drawings, and descriptive matter in which preferred embodiments of the invention are illustrated.

DESCRIPTION OF THE PREFERRED EMBODIMENTS

Figure 1:
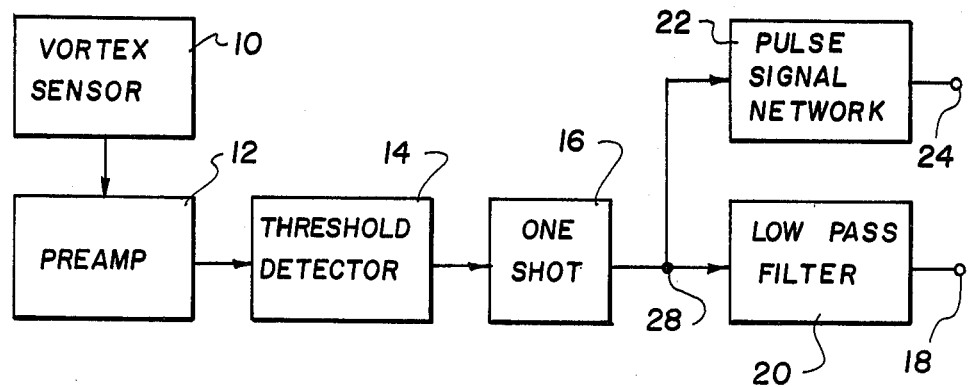
FIG. 1 is a block diagram of a typical analog and pulse arrangement for a vortex shedding flowmeter according to the invention.

Referring to the drawings in particular, the invention embodied therein in FIG. 1 comprises a vortex shedding flowmeter circuit having a vortex sensor 10 which generates an output which has a frequency corresponding to the vortex shedding frequency of a vortex shedding flowmeter. The output of vortex sensor 10 is supplied over a preamp 12 to a threshold detector 14. The output of threshold detector 14 is supplied to a one shot 16 which generates a fixed width pulse for each cycle of the vortex frequency. The output of one shot 16 is supplied to a low pass filter 20 for generating an analog signal at terminal 18, and to a pulse signal network 22 which generates a pulse signal at terminal 24.

The low pass filter 20 converts the fixed width pulse coming from one shot 16 into an analog level corresponding to the rate of the pulses. This thus corresponds to the vortex shedding frequency.

Figure 2:
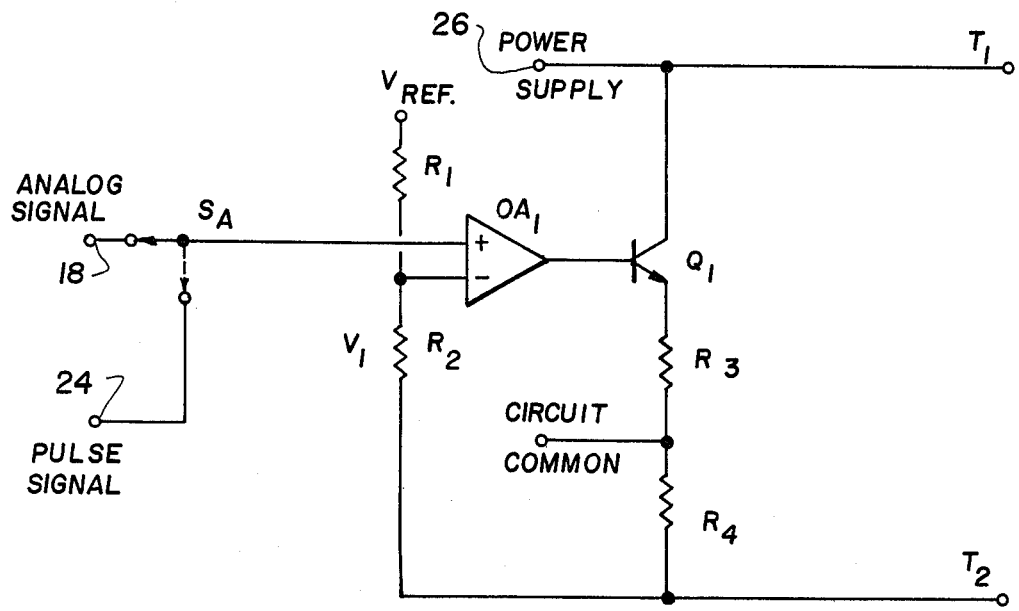
FIG. 2 is a schematic representation of an output stage for receiving an analog and pulse signal from the circuitry of FIG. 1.

Referring to FIG. 2, an output stage is shown which can be connected to the pulse signal terminal 24 and the analog signal terminal 18. These signals can be selected by switch $S_A$ to apply either one or both of the signals to the positive input of an operational amplifier designated $OA_1$.

The output stage of FIG. 2 controls the current in two lines attached to terminals $T_1$ and $T_2$. These lines contain a power supply designated 26 and current sensor means (not shown) at an opposite end of transmission lines connected to terminals $T_1$ and $T_2$.

Resistor $R_4$ senses the current across terminals $T_1$ and $T_2$ and develops a voltage proportional to that current. Resistors $R_1$ and $R_2$ feed back a fraction of this voltage to the negative input of amplifier $OA_1$.

This amplifier compares the input signal and feedback signal and adjusts the loop including its own gain and a transistor $Q_1$ so that the two voltages are made equal. This action renders the output current proportional to the input signal of this circuit stage. This signal is either an analog level, yielding a 4–20 mA output signal, or a pulse signal, yielding a pulsed output transversing the range of 4–20 mA, equalling approximately 4 mA with the pulse off and approximately 20 mA with the pulse on. These two inputs, analog or pulse, are selected typically by a switch such as $S_A$ or by the movement of a plug cable jumper.

Figure 3:
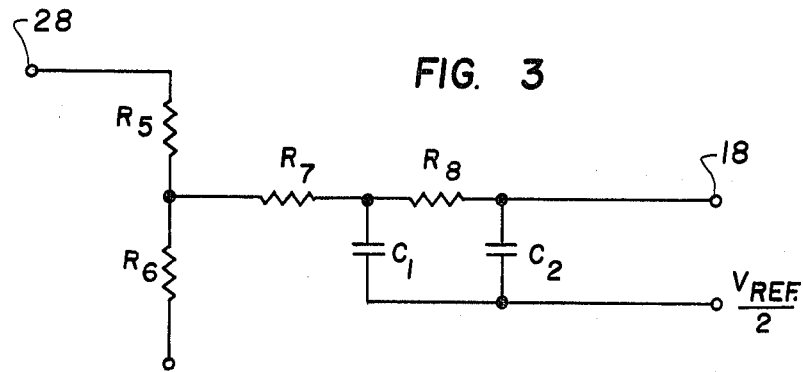
FIG. 3 is a schematic representation of a low pass filter used in the circuitry of FIG. 1.

FIG. 3 shows an embodiment of low pass filter 20 from FIG. 1.

The low pass filter is used to smooth or average the fixed width pulses from the one shot 16. Filtering action is effected by resistance and capacitor combinations $R_7$, $C_1$ and $R_8$, $C_2$. In the output stage of FIG. 2, the voltage at the plus input of amplifier $OA_1$ may not be a circuit common. In this instance, the voltage $V_1$ across resistor $R_2$ in FIG. 2 will appear across capacitors $C_1$ and $C_2$ in the low pass filter section. Since these units typically have large values of capacitance and have leakage associated with them, they should have no DC voltage across them to encourage leakage. This leakage has severe affects on the accuracy of the signal for the numerals 4–20 mA arrangement. For optimum sensitivity, $V_1$ is equal to one half the reference voltage $V_{REF}$. Thus the capacitors are returned to a value of $V_{REF}/2$. Resistors $R_5$ and $R_6$ are selected so that the voltage at their connection equals one half the reference voltage when the one shot is off. A minimum of voltage is thus provided at $C_1$ and $C_2$ to minimize leakage problems.

Figure 4:
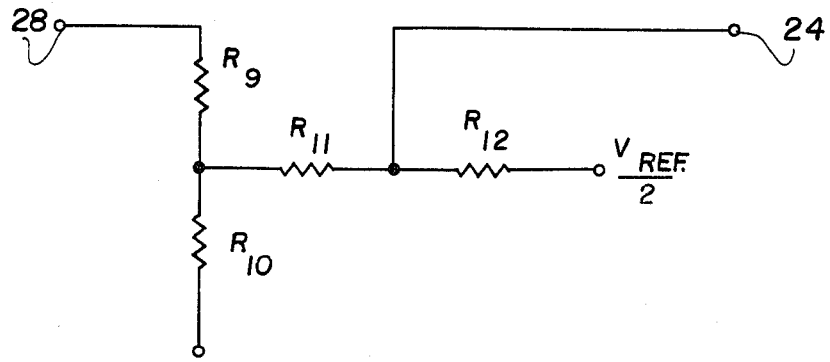
FIG. 4 is a schematic representation of a pulse signal network useful in the arrangement of FIG. 1.

FIG. 4 is a schematic representation of a pulse signal network 22 of FIG. 1.

This circuit generates a pulsed frequency signal base level and amplitude. Resistors $R_9$ and $R_{10}$ form a voltage $V_{REF}/2$ at their connection point in a similar manner to resistors $R_5$ and $R_6$ in FIG. 3. The circuit of FIG. 4 actually can be incorporated into the circuit of FIG. 3 utilizing the resistors $R_5$ and $R_6$.

Resistors $R_{11}$ and $R_{12}$ select a fraction of the excursion of the pulse voltage at the connection between resistors $R_9$ and $R_{10}$ and presented to the output stage at levels (pulse off and pulse on) to yield pulses between 4 mA (off) and 20 mA (on) in the output circuit.

Figure 5:
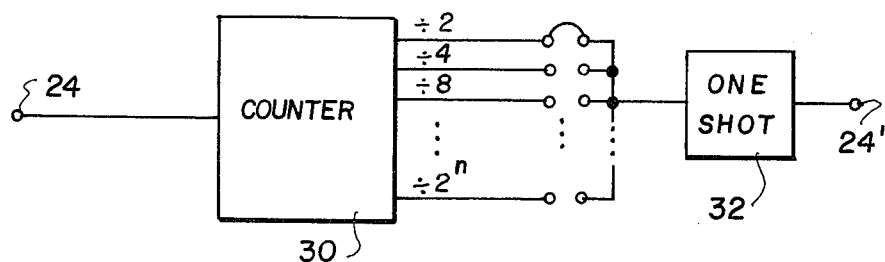
FIG. 5 is a block diagram of a pulse frequency range selection circuit which can be connected between the pulse signal network of FIG. 4 and the output stage of FIG. 2.

Scaling or range selection can be achieved using the circuit of FIG. 5. This circuit contains a counter 30 which divides the vortex shedding frequency by a factor of $2^n$, where n equals 1 to a maximum desired in the circuit. The following one shot 32 generates a narrow pulse for the output although an alternate embodiment would be to transmit a 50% duty cycle wave form. The circuit of FIG. 5 is typically used between that of FIGS. 1 and 4.

In FIGS. 3, 4 and 5 the output of one shot 16 from FIG. 1 at terminal 26 is shown connected to the input of each circuit respectively.

FIG. 5 is shown connected between a terminal 24 of FIG. 4 and another terminal 24' which can be connected to terminal 24 of FIG. 2.

Wherever possible to keep power consumption low, since only the 4 mA of the 4–20 mA is available to operate a circuit, CMOS integrated circuits are used.

The one shots are typically MC14538 units and the counter is typically CD4024B. The amplifiers are typically OP20 units or LM108/308 units.

Elements such as the vortex sensor, preamp and threshold detector of FIG. 1 are known in the art as off the shelf items.

While specific embodiments of the invention have been shown and described in detail to illustrate the application of the principles of the invention, it will be understood that the invention may be embodied otherwise without departing from such principles.

What is claimed is:

1. A vortex shedding flowmeter circuit arrangement comprising:
    a vortex sensor for generating a vortex shedding frequency signal;
    pulse means for generating a fixed width pulse with a frequency equal to the vortex shedding frequency signal, connected to said vortex sensor;
    a low pass filter for generating an analog signal which is proportional in level to the vortex shedding frequency signal, connected to said pulse means for receiving the fixed width pulse; and
    an output stage connected to said pulse means and low pass filter for selectively receiving at least one of said fixed width pulse and analog signal, a two wire transmission line connected to said output stage, and power supply means connected to said two wire transmission line including an amplifier having a negative and a positive input and an output proportional to a difference between a value at the positive and negative input, and feedback means connected between the amplifier output and its negative input for adjusting the amplifier output to equal a current sensed in said transmission line, said positive input of said amplifier connected to receive at least one of said fixed width pulse and analog signal.

2. A circuit arrangement according to claim 1, including a pulse signal network connected to said pulse means for receiving said fixed width pulse.

3. A circuit arrangement according to claim 2, including a scale selector connected to said pulse signal network.

4. A circuit arrangement according to claim 3, wherein said scale selector comprises a counter and a one shot for receiving an output from said counter.

* * * * *